(12) United States Patent
Shaw et al.

(10) Patent No.: US 6,205,492 B1
(45) Date of Patent: Mar. 20, 2001

(54) METHOD AND COMPUTER PROGRAM PRODUCT FOR INTERCONNECTING SOFTWARE DRIVERS IN KERNEL MODE

(75) Inventors: George H. J. Shaw, Woodinville; Bryan A. Woodruff, New Bend, both of WA (US); Thomas J. O'Rourke, Oulu (FI)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/825,856

(22) Filed: Apr. 4, 1997

(51) Int. Cl.[7] ............................. G06F 9/54; G06F 15/17
(52) U.S. Cl. ......................................................... 709/321
(58) Field of Search ........................... 395/681; 709/301, 709/321, 310, 322, 324, 325, 326, 327

(56) References Cited

U.S. PATENT DOCUMENTS

| | | | |
|---|---|---|---|
| 5,386,568 | * | 1/1995 | Wold et al. ........................ 395/700 |
| 5,485,617 | * | 1/1996 | Stutz et al. ........................ 395/700 |
| 5,768,126 | * | 6/1998 | Frederick ....................... 364/400.01 |
| 5,793,961 | * | 8/1998 | Marisetty et al. ............... 395/200.8 |

OTHER PUBLICATIONS (Gupta) Gupta, Sandeep et al. "Cues: File Subsystem Data Streams", May 30, 1996.*
(Jones) Jones, Mitt. Driver's ed. (Wind32 Driver Model), Oct. 1997.*
(Computergram) Computergram International "New Tool from Vireo Software is the First to Automate Device Driver Design for Windows NT", Mar. 12, 1997.*

Custer, Helen, *Inside Windows NT*, "The I/O System," Chapter 7, 1992, pp. 325–361.

Custer, Helen, *Inside Windows NT*, "Windows NT File System (NTFS)," Chapter 9, 1992, pp. 395–450.

* cited by examiner

*Primary Examiner*—Majid Banankhah
*Assistant Examiner*—Lewis A. Bullock, Jr.
(74) *Attorney, Agent, or Firm*—Workman, Nydegger & Seeley

(57) ABSTRACT

A method and computer program product are presented that overcome the inefficiencies in user mode processing of multimedia data by allowing an application running as a user mode process simply to start and connect multiple blocks of kernel mode functionality in the form of drivers or filters (separate logical blocks of driver executable code). Once the kernel mode filters are set up and connected, the user mode application need not be active until notified by the filters. Such notification may occur at the end of processing or at any relevant event chosen by the application as part of the filter initiation and set up. Furthermore, a user mode application may query a kernel mode filter or driver of its capabilities and requirements so that it may properly make the connections between the different filters chained together to process a stream of data and request appropriate notifications. These connection may represent actual driver to driver data exchange, or remote connections. In one exemplary embodiment, property, method, and event sets define compliant filters and native operating system I/O constructs such as file objects are used to define the instances of connection "pins" that are interconnected by the third party user mode application.

16 Claims, 9 Drawing Sheets

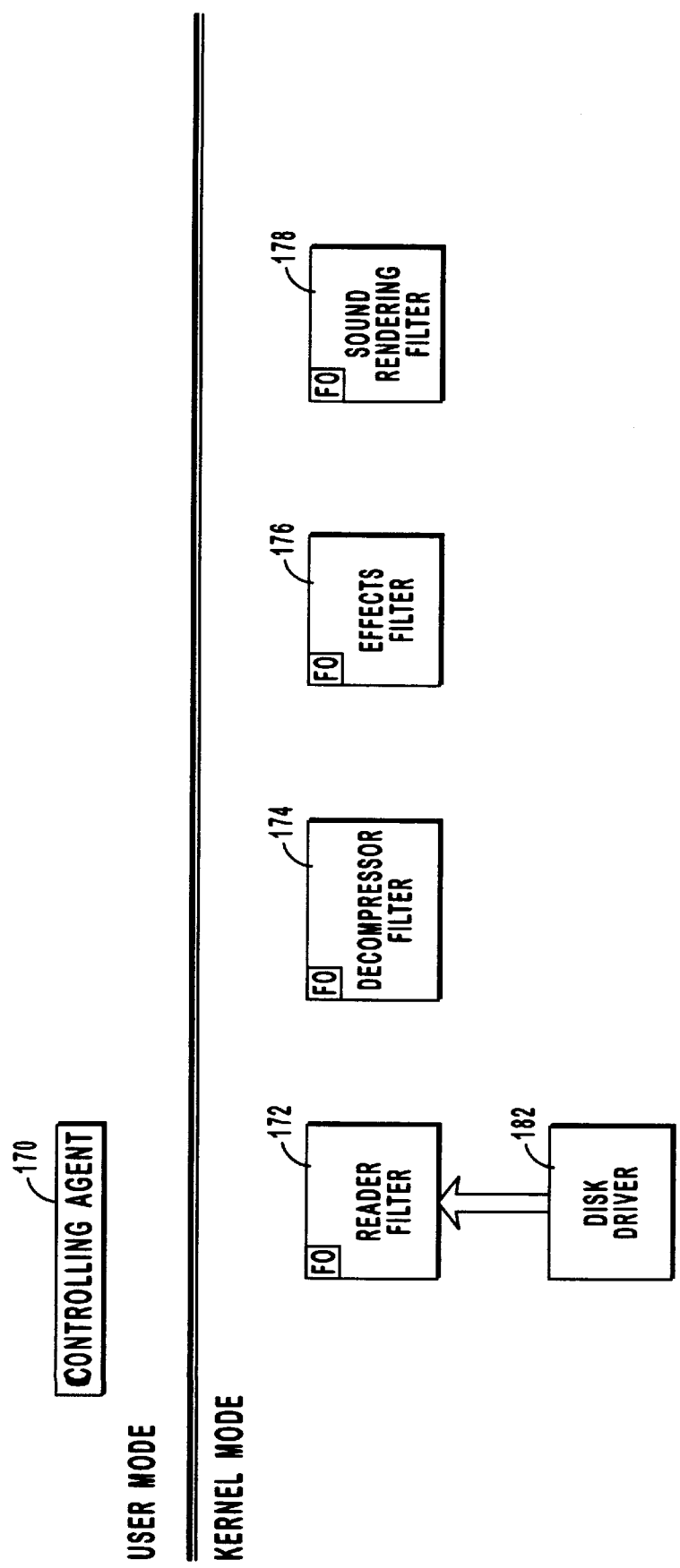

METHOD AND COMPUTER PROGRAM PRODUCT FOR INTERCONNECTING SOFTWARE DRIVERS IN KERNEL MODE

BACKGROUND OF THE INVENTION

1. The Field of the Invention

The field of the present invention is computer software driver development. The present invention relates to tools, software frameworks, conventions, etc. to simplify code generation of drivers and provide standardized access points. More specifically, the present invention relates to standardized methods, computer program products, and data structures to interconnect in kernel mode software drivers written by different developers to allow continuous processing between the different drivers without making inefficient transitions back and forth between kernel mode and user mode.

2. Present State of the Art

Software drivers are normally built to control hardware or provide a software function and are run under an operating system without much system overhead and relatively few restrictions. This allows the drivers to access hardware and service time critical processing requests more quickly since there is less system code running to ensure proper behavior and "trap" invalid access or interference with another process running under the operating system.

Operating systems normally have different operational levels or "modes" depending on the amount of access and security features that are implemented. For example, normal application programs run at the lowest priority and have a full arrangement of security devices in place to prohibit interference with other applications. Hardware is only accessed through controlled interfaces. For convenience, this is referred to generally as "user mode," and the Windows NT operating system, which will be used as part of an example implementation of the present invention hereafter, supports a user mode. Similarly, most other operating systems of any complexity have an operating mode that is equivalent to "user mode."

Drivers, on the other hand, run in a operating system mode that has a much higher run priority and little security protection to allow access to actual hardware that the drivers, in many instances, directly manipulate. Many applications are benefited by running in this looser and more performance-oriented mode, generally referred throughout, in Windows NT terminology, as "kernel mode." Again, other robust operating systems will have a functionally equivalent mode.

Because the general concept of a software driver contemplates controlling specific hardware, drivers are normally developed in isolation from one another and provided by the hardware manufacturer. For example, software drivers providing some I/O service associated with an add-in hardware card through a device definition need not communicate, nor know the existence, of any other driver.

In some circumstances, this dedicated approach to driver development and associated lack of communication capability between drivers forces processing preferable for kernel mode operation into user mode operation with the performance disadvantages associated therewith.

One prime example of a program currently incapable of easily using kernel mode drivers, used throughout this application, comprises graph building functionality that allows a user to select and connect together different processing blocks, called filters, to successively manipulate a stream of multimedia data. The data typically is a series of samples representing sound or video, and the processing blocks may include decompression processing for compressed data, special effects processing, CODEC functionality, rendering blocks to convert the data into analog signals, etc.

Such filters are typically located in user mode so that the graph builder portion of the program may interconnect and control their operation and be responsive to user input and rearrangement of processing blocks. Because of the consistent stream nature of multimedia data and the generation of large quantities of data, performance is a critical issue. In a general purpose operating system, system performance as a result of repeatedly passing/switching back and forth between user mode and kernel mode and the implied security validation of such transitions can be so degraded as to prohibit certain multimedia applications.

Furthermore, the processing blocks will many times have hardware associated therewith requiring multiple transitions between user mode and kernel mode components. Such transitions comprise another form of overhead that takes away from the overall multimedia processing system performance. When making transitions between user mode and kernel mode, there may also be overhead associated with copying the data between different buffers that would be unnecessary if the processing remained in kernel mode.

Yet another detriment of making kernel mode to user mode transitions is the limited ways of scheduling the work tasks with the operating system. If work can be kept in kernel mode, system performance can be further optimized by taking advantage of more performance oriented scheduling methods, such as software interrupts and deferred procedure calls (DPCs).

Furthermore, it would be advantageous to allow different driver developers to create drivers that are connectable to one another by following a common interconnection scheme and definition. In this manner, any driver functionality written to a common interface could be interconnected into a system of functional processing blocks with all data transitions occurring in kernel mode. Furthermore, with a known specification, many different driver developers could develop interoperable and interconnectable driver software.

SUMMARY AND OBJECTS OF THE INVENTION

It is an object of the present invention to interconnect software drivers in a standardized fashion in order to prevent operating system mode transitions during processing of data and thereby enhance system performance.

It is also an object of the present invention to provide a base mechanism for interconnectable software drivers that is extensible by third party developers.

It is another object of the present invention to allow more performance critical processing to occur in kernel mode.

It is a further object of the present invention to allow a third party component to interconnect software drivers.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method and computer program product for interconnecting software drivers in kernel mode is provided. A given driver or filter will support and define connection "pin factories" that produce a pin instance of a certain type that may interconnected to other pin instances on other drivers to allow processing messages to be consecutively processed in kernel mode by the drivers without necessary resort to a user mode agent. In this way, data may flow entirely in kernel mode and be more efficiently processed without having the overhead of crossing into user mode.

A third party agent desiring to connect compliant drivers will query the drivers of their capabilities. Such capabilities include what kinds of connection pin factories may be used to instantiate connection pin instances, including their relevant characteristics, such as type of data handled, data formats, transfer rates, medium or mode of transfer, input or output nature of a connection pin instance, etc.

Once a third party agent, typically running in user mode, has queried the capabilities of one or more compliant drivers, the agent will determine the best connection characteristics for "chaining" multiple drivers together so that data may be optimally processed between them. This determination step occurs after all driver capabilities have been queried so that the optimal connection criteria may be selected.

The third party agent then interconnects the drivers by creating an instance of the necessary connection pins on each driver using the pin factory. The agent will specify a data format and a connection format as part of the connection pin instance creation. Furthermore, reference to previously created connection pin instances will be specified in requests for creating other connection pin instances in order to effectuate a connection between connection pin instances.

In an exemplary embodiment implemented under the NT operating system, an actual connection pin instance is created by a create I/O operation that returns a handle to a "file." The create I/O request will contain the driver instance handle and reference to a data structure indicating data format and connection format for the connection pin instance.

In order to create a compliant driver, a driver developer will support certain standard facilities to allow a user mode agent to query capabilities and make interconnections between drivers. In one embodiment, built on the Windows NT operating system, this is achieved by use of "sets" (i.e., property, method, and event sets) that implement the desired functionality.

A set is logically defined as having a GUID (globally unique identifier) to identify the set as a whole and a RUID (relatively unique identifier e.g., relative within the set itself) for each element of functionality within the set. Each set is associated with only one or two IOCTLs (IO Controls), and an IOCTL combined with a set specification controls all interaction with the driver.

As currently embodied, three types of sets are utilized, namely, property sets, method sets, and event sets. Property sets are used for managing values or settings within the driver, such as sound volume, transfer rate, etc., and use a single IOCTL with a flag indicating whether the call is getting a property value and or setting a property value. Method sets are used for managing the operations that a driver may perform, such as allocating memory, flushing buffers, etc., and uses a single IOCTL to call the specified method. Event sets are used for managing events associated with driver processing, such as device change notification, data starvation notification, etc., and uses two IOCTLs, one for enabling a specified event and one for disabling a specified event.

To use a set, an I/O control operation is initiated using the specified IOCTL and reference to a data structure having the set GUID, RUID, and other necessary data. For example, setting a volume property on a sound card driver would entail an I/O control operation using a set property IOCTL, specifying the appropriate GUID for the property set having the volume setting, indicating the specific RUID within that set indicates the volume property, and containing the new volume setting value.

To query the sets supported, a null GUID is used along with a query flag on a specified IOCTL for a particular set type (e.g., property set IOCTL, method IOCTL, or event enable IOCTL) and a list of set GUIDs supported will be returned. To query supported properties, methods, or events within a given set, the set GUID, set type IOCTL, and a query flag are used with the operation returning a list of supported RUIDs.

By using the generic set mechanism, a minimum of functionality may be implemented to support a compliant driver but still allow unlimited extensibility. A set may be defined in a written specification that can be independently coded by a multitude of different driver developers to create a system of interoperable and interconnectable drivers as long as particular sets are implemented. Furthermore, the specification can define mandatory properties, methods, and events that must be supported as well as optional properties, methods, and events that can be implemented depending on the driver functions and advanced capabilities. In addition to the basic minimum commonality required, driver developers may incorporate additional functionality by defining their own sets and assigning them a GUID. By being able to enumerate supported functionality (i.e., make queries for supported GUIDs and RUIDs ), a caller, such as a third party controlling agent, can adjust expectations or make appropriate compensation depending on the capabilities of the underlying filters.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 9A and 9B are logical overview diagrams of the kernel mode drivers and connections used to create a chain of kernel mode filters under the direction of a user mode controlling agent to implement a system for reading sound data from a hard drive, processing the data with the kernel mode filters, and rendering the data to be heard through a speaker.

DETAILED DESCRIPTION OF THE PREFERRED EMBODIMENTS

Figure 1:
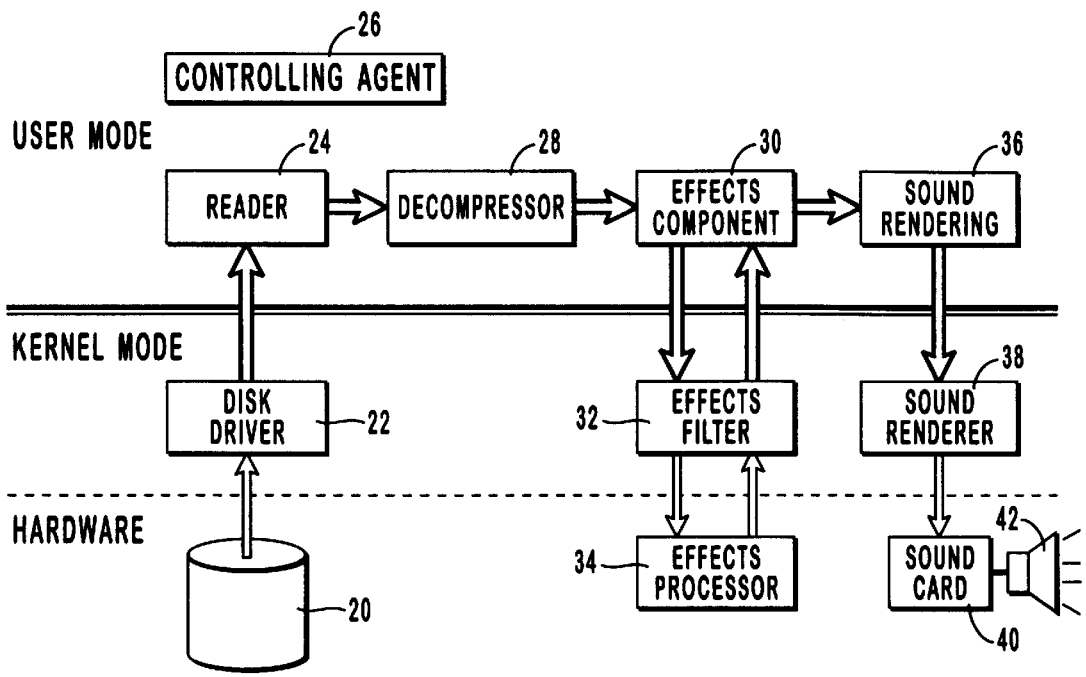
FIG. 1 is a prior art data flow diagram showing a system of interconnected filters and drivers under the direction of a controlling agent for bringing sound data from a disk file, processing the sound data in some form, and rendering the sound data to be played through a speaker.

As used herein, the term "user mode" refers to a level of operation in an operating system where most user written programs run. The user mode level of operation is typically the most secure level and has a significant amount of overhead to prevent one application program or process from interfering with another application program or process. Furthermore, access to system resources is highly controlled through specific interfaces and run priority is generally one of the lowest, if not the lowest.

As used herein, the term "kernel mode" refers to a level of operation in an operating system having significantly less restrictions than the user mode level of operation. Examples of kernel mode programs or processes would include software drivers for controlling hardware components. Typically, kernel mode programs are performance sensitive, and therefore, have less operational overhead than user mode programs. Furthermore, access to hardware and many system resources is unrestricted or much less restricted than for user mode programs. In many instances, program code running in kernel mode relies on programmer discipline and conformity to convention in order to establish good system behavior (e.g., not disrupting another program's address space, etc.). Another term used for kernel mode is "trusted" code.

As used herein the term "driver" refers to software driver programs typically running in kernel mode. The term driver may also refer to the actual executable program that is loaded onto the operating system or a portion thereof that imparts certain functionality. Drivers are in many instances, though not necessarily, associated with some form of hardware.

As used herein, the term "filter" refers to a portion of the functionality found within a software driver, including the entire driver itself, where connection points may be exposed for sending data through the filter. For example, a software driver may support a number of different filters or may have one single function. Furthermore, a number of filters from different drivers that are internally connected together and externally exposing connection points for input and output may collectively be referred to as a single filter. Also, in a more generic sense, the term filter may refer to the operation performed, such as decompression, etc., regardless of whether that occurs in a software driver filter running in kernel mode or another piece of program code running in user mode.

As used herein, the term "driver object" refers to an operating system entity, defined by the operating system, for managing and making known a software driver as a system resource.

As used herein, the term "device object" refers to a system level entity defined by the system, for making known a portion of a drivers functionality available for use as a system resource and defines the driver functionality and availability to other system components. Both the driver objects and device objects are typically created upon loading and initialization of the driver software.

As used herein, the term "file object" refers to an operating system entity, defined by the system, for managing an invocation of a resource specified by a device object. A file object provides a context for usage of a driver object. Furthermore, a file object may be hierarchically related to another file object if the previous file object is designated as a "parent" during the creation of the new file object. File objects are typically used in managing all I/O operations that operate on a stream of data.

As used herein, the term "data" refers to any information that is processed through the interconnected kernel mode filters. Such data includes media data representing video, audio, text, MIDI, etc. but may also include control information or parameters for other applications. For example, a kernel mode filter graph may be used in process control operations where the control information passed between the different filters is used to develop control signals for actuating machinery. While examples are given of media processing systems, other applications could in like manner benefit from the system of interconnected kernel mode filters explained herein.

Throughout this application, the description of the present invention is described within the context of the Windows NT™ operating system available from Microsoft®. Furthermore, familiarity with the Windows NT I/O architecture is presumed in order to understand the preferred embodiment explained herein. A good tutorial of the I/O system as well as the NT operating system in general can be found in the book "Inside Windows NT" written by Helen Custer and published by Microsoft Press and is further incorporated herein by reference.

While the discussion of the drivers and system entities such as file objects, device objects and driver objects are explained herein within the context of how they operate in the Windows NT operating system, those skilled in the art will appreciate that the present invention may be implemented on other operating systems having analogous components, whether or not they use the same terminology. For example, should another operating system have an entity that operates as a file object, it could be interpreted as a file object regardless of its actual title.

Referring now to FIG. 1, an example system is presented for reading a stream of sound data from a disk drive and rendering that sound data so that it may be heard through a speaker according to the prior art model. An amount of data is stored on hard drive 20 representing sound in the form of digitized sound samples. Alternatively, the source of the sound data stream may be digitized information coming over a phone line, digitized information from network or other communication packets, or other sources known in the art. The data stream is composed of digitized samples having time interval information associated therewith either by data format and convention or by explicit timestamp information attached to each sample. A kernel mode disk driver 22 interacts with the disk drive hardware 20 and is under control of a user mode reader program component 24. A controlling agent 26 manages the different components in order to effectuate the rendering of the sound data and may include dynamic graph building capabilities so that the different software components may be dynamically allocated in order to provide custom filtering or other processing paths as designated by an end user.

The reader component 24 will interact with disk driver 22 using a standard I/O control interface of the operating system and will cause the compressed sound data to be read from the disk drive 20 into buffers allocated in user mode as part of the user mode process address space. Next, a decompressor component 28 will decompress the compressed data into its decompressed format for processing. As shown, this step is done entirely in user mode with the attendant lower priority and process behavior safety mechanisms.

The effects filter 30 will operate on the data to provide some special effect and will have an accompanying effects filter 32 operating in kernel mode. Furthermore, an effects processor 34 may be present or the effects filter may operate entirely in software emulating the actual hardware processor. In order to access the effects filter 32 the effects component 30 will use the system I/O control mechanism to transfer the data and control to the effects filter. Again, the kernel mode/user mode boundary is crossed in order to make this transition.

The effects filter 32 will control the effects processor 34 and cause whatever special effect is necessary or desired to be made on the data. This may entail copying all the data from the effects component 30 down to the effects filter 32 and again to the effects processor 34 depending on actual system configuration. While many software effects components have a hardware processor associated therewith, others function entirely within system software running on the host processor.

After control and the data is transferred back into user mode at the completion of the processing of the effects component 30, it is then transferred to sound rendering component 36. The sound rendering component 36 will transfer the control and data to the sound rendering driver 38 which in turn controls the sound card 40 in order to render the data, as processed and filtered, as sound through speaker 42. As can be readily seen, there exists a variety of transfers between user mode and kernel mode that add inefficiencies to the rendering of the sound data. Because of the timing sensitive nature of multimedia data, such as a continuous stream of sound or video, it is advantageous to reduce these inefficiencies and transitions of control as well as the multiple copying of data between different buffers.

One embodiment of the present invention and used throughout will consist of a service provided on the Windows NT operating system architecture. This service is broken into different software components that a user of the system will access. First, a user mode API is available that will include a routine for creating connection pin instances and other file objects representing particular functionality, such as a clock mechanism or a buffer allocation mechanism. Additionally, and more importantly, there will be a complete set of routines and data structures to assist the driver developer in making drivers that are compliant with the standardized architecture. By utilizing such facilities from the system, different driver developers may create compliant drivers that will interact with one another according to the specified architecture. User mode agents communicate with compliant drivers through an environment subsystem running in user mode that will communicate with the system services of the NT executive and the I/O manager. This is the same standard I/O mechanism for all other I/O and the present implementation of the preferred embodiment will utilize existing system services as much as possible.

Figure 2:
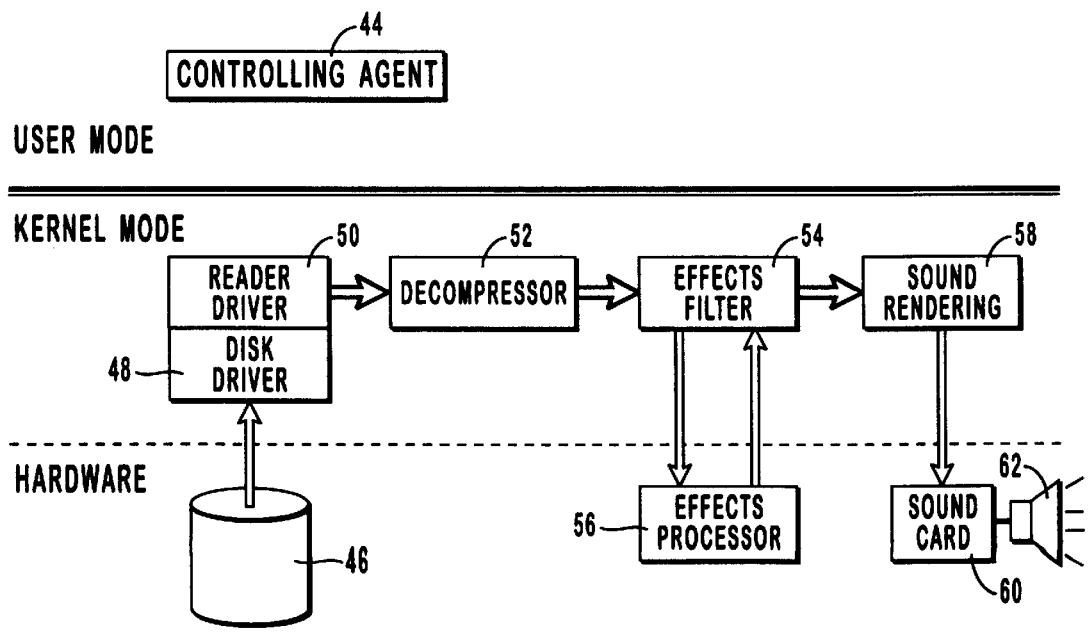
FIG. 2 shows a system according to the present invention having the same purpose as that shown in FIG. 1 to read sound data from a disk drive, process that data, and render that data to be heard on a speaker, wherein the processing filters and rendering are handled by interconnected kernel mode drivers, again under the direction of a controlling agent.

The architecture of the system of FIG. 1 utilizing the present invention will appear as shown in FIG. 2. A controlling agent 44 will query the drivers known in order to then make interconnections according to data format and connection format to effectuate the rendering entirely in kernel mode. Furthermore, the controlling agent will receive notifications of important events so that it may exercise control as necessary. Examples of such events would include end of processing, a data starvation situation, etc.

In this configuration, the sound data is read from disk drive 46 by the disk driver 48, as before. A reader driver 50 controls disk driver 48 and is "vertically" associated with disk driver 48 according to the NT layered I/O architecture as used in conventional fashion. The terms vertically and horizontally are used to distinguish driver connections that currently occur as part of the NT layered I/O architecture (vertical) and connections according to the interconnected kernel mode drivers made dynamically by a third party controlling agent (horizontal).

Reader driver 50 is also interconnected "horizontally" to a decompressor driver 52 according to the connection methods explained hereafter and is managed by the controlling agent 44. Decompressor 52 will perform the decompression in kernel mode before passing the data and control to the effects filter 54. The effects filter will apply the special effects utilizing an effects processor 56 as necessary before passing the data and control to the sound rendering driver 58 that controls the sound card and causes the data to be rendered as sound on speaker 62. As can be noted by reference to FIG. 2, keeping processing in kernel mode represents an efficiency advantage by eliminating multiple transitions between user mode and kernel mode and by reducing the amount of overhead normally associated with processing in user mode.

Figure 3:
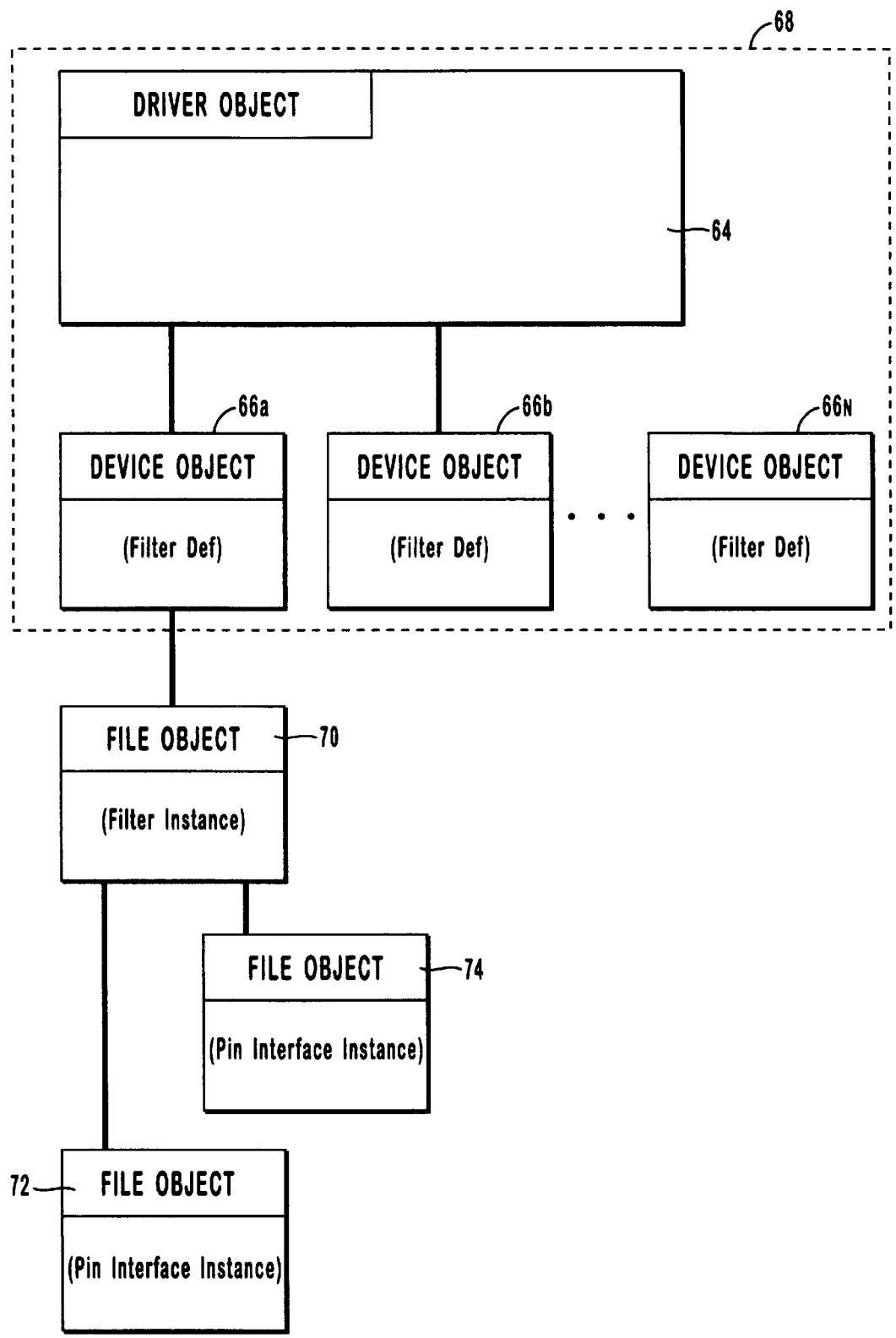
FIG. 3 is a vertical relationship model showing the relationships between driver objects, device objects and file objects as created and used in an operating system.

Referring now to FIG. 3, a logical diagram showing the hierarchal nature of system objects related to interconnected software drivers compliant with one embodiment of the present invention is shown. A driver object 64 is created to represent the executable software code image as loaded in memory. The driver code image contains the entirety of the driver's functionality, and the driver object 64 includes information regarding the image, such as its location on the system, the kinds of devices supported, etc.

For each type of independently accessible functionality by a controlling agent, device objects 66a–66N are created in the I/O directory structure representing the different functions that are available that will be accessed by user mode clients. These typically represent filters or other portions of functionality independently available. The driver object 64 and the device objects 66a–66N are created upon installation of the driver code as represented by the enclosing box 68.

Historically, a device object exists for each element of physical hardware. The flexibility in modern I/O systems, however, allows a device object to represent a filter implemented entirely in software. As such, device objects may be readily created for each instance of a filter implemented solely in software. A software filter may therefore be implemented so that each instance as represented by a device object has a one-to-one correspondence with a device object or a single device object may follow the more traditional approach and manage multiple file objects, with each file object representing a client instance of the filter.

Upon a device object, as shown for device object 66a, file objects are created representing independent instances of the functionality represented by device object. While a device object represents a filter and may manage multiple instances of that filter, a file object represents the actual instance of that filter used by a particular entity. Therefore, file object 70 is an instance of the filter defined by device object 66a.

To use a filter, the controlling agent or other user mode client opens a file on a device available in the I/O directory structure. A file object with appropriate context information will be created and a handle to that file object returned to the user mode client. While file objects may be hierarchally related by specifying a "parent" file object during creation, file objects will also have a sibling relationship in that they are all children of the same device object.

Context information within a file object consists of information to manage the I/O interface with user mode clients, the "state" of the entity that the file object represents, etc. The context information has system required information and further includes user definable areas that can be given special meaning. An example of how the user definable area can be used will be shown hereafter discussing the implementation of a validation and IRP routing method.

In order to provide connection pin instances, the file object 70 representing a filter instance will be used as a parent in creating children file objects representing the connection pin instances for a particular filter. While file object 70 will be queried for the connection pin factory definitions and availability, actual file objects will be created for each instance of such a pin factory, using the particular file object as the appropriate informational context in order to validly and correctly create the connection pin instance. For example, file objects 72 and 74 represent connection pin instances for the filter represented by file object 70 and are hierarchally related to file object 70. The connection pin instances, as represented by file object 72 and 74, respectively, may be a data path into and then out of the filter instance (represented by file object 70) which can be used for connecting to other connection pin instances in forming a series of chained filters or other driver functionality.

Just as a pin instance is represented by a file object having a hierarchial relationship to another file object representing the filter instance in order to provide context information for the pin instance, other file objects may be hierarchically related to a pin instance in order to represent other functionality so that proper context information is available. Context information is necessary to distinguish one pin instance from another according to the individual parameters used in creation, such as pin data format, communication type, etc.

Other operational entities, such as a buffer allocation mechanism, a timing mechanism, etc., requiring either an individual context or user mode control through a handle may also be represented by file objects. Furthermore, hierarchical relationships between the file objects (e.g., a buffer allocation mechanism associated with a particular connection pin instance) may be established if necessary by specifying a parent file object during creation of the child file object. These parent/child relationships exist to determine relationship and structure between the file objects representing the operational entities. Additionally, a particular type of "parent" file object will only be able to produce certain types of "children" file objects, thus requiring the creation validation mechanisms as explained hereafter. Again, such file objects have corresponding handles available in user mode that are returned to a client through a system API call such as NtCreateFile.

The handles to file objects are used by user mode clients, such as a controlling agent, to communicate with the kernel mode drivers. The hierarchical chain of file objects, device objects, and driver objects allows the I/O subsystem to traverse back to the driver object through the hierarchically related file objects and device objects to arrive at the entry points into the actual driver code. Such entry points are references (e.g., pointers) to functions in the software driver code. Furthermore, each of the objects in the object pathway between a particular file object and the driver object having the entry points to the software driver code provides important context information for the I/O subsystem in creating IRPs as well references into data structures used for properly routing IRPs according to the routing and validation mechanism explained hereafter.

Handles for file objects and other system objects are process-specific and are the means by which a user mode process will communicate with an underlying object. It is interesting to note that multiple handles may be created to reference a single underlying system object, such as a file object. This means that multiple applications may be feeding information to a pin instance as represented by a file object.

One element of information that is important for interconnecting different drivers is the device object stack depth parameter. This will indicate the IRP stack location of a particular driver object. In this manner, a single IRP may be used and passed between interconnected drivers using the I/O manager, thereby providing a performance enhancement over separately creating and sending IRPs between the various interconnected drivers. Alternatively, each driver could create through appropriate I/O manager calls new IRPs for each successive communication and cause each new IRP to be sent to the next driver in the chain of interconnected drivers.

Figure 4A:
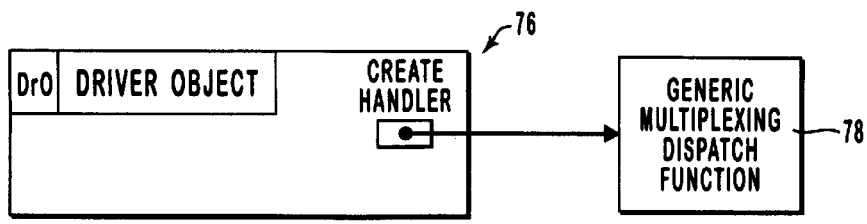
FIGS. 4A, 4B and 4C are logical block diagrams of a driver object, device object, and file object, respectively, showing their logical relationship with the data structures and program code to route messages to appropriate process handling code and to validate the creation of new file objects according to the system of the present invention.
Figure 4B:
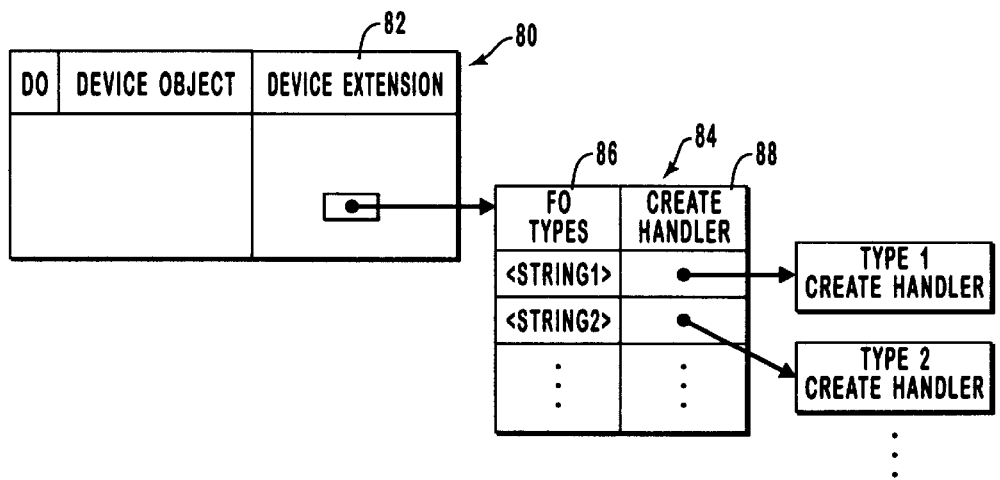
Figure 4C:
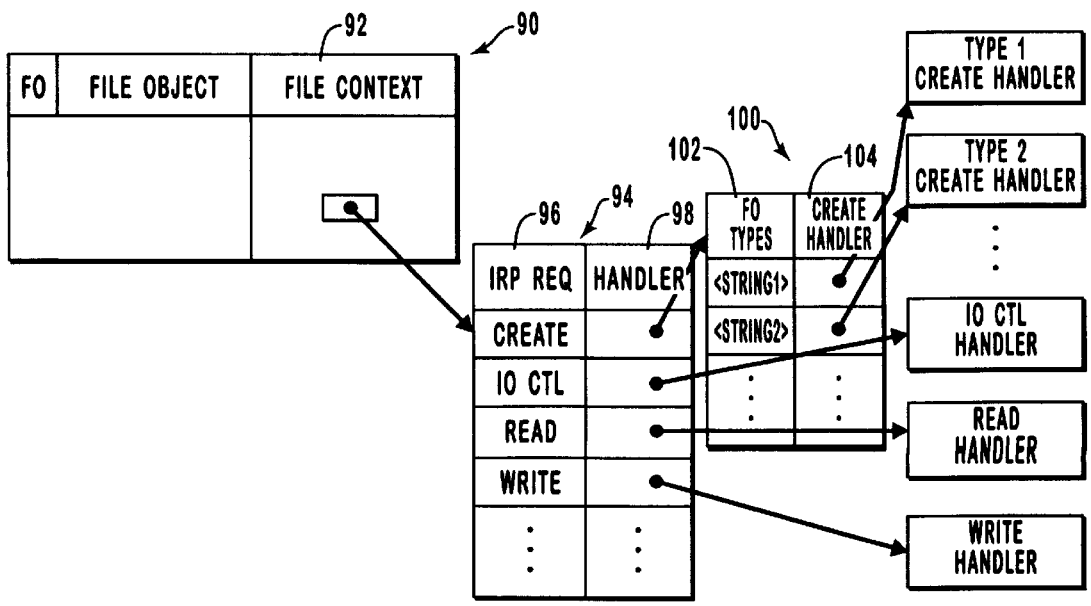

Referring now to FIGS. 4A–4C, extensions to the system driver objects, device objects, and file objects are shown that allow validation of file object creation of differing types as well as I/O Request Packet (IRP) routing to appropriate handlers. FIG. 4A shows a driver object 76 representing the executable code implementing one or more filters or other driver functionality. Within the driver object, the Windows NT architecture requires a reference to a create handler provided by the software driver developer. According to this embodiment, a multiplexing dispatch function 78 is referenced from the driver object 76 as the create handler and will be used to route messages to particular create handlers depending on the file object type to be created. Operation of the multiplexing dispatch function 78 will be explained in connection with the flow chart shown in FIG. 6 hereinafter.

In like manner, other handlers from the driver object will indicate a multiplexing dispatch function and, depending on implementation, they may be the same function. In other words, as explained in more detail below, each type of I/O handler reference (e.g., read, write, device control, etc.) will point to a multiplexing dispatch function that uses the extension data in a device object and the context information in a file object in order to route the message to the appropriate handler. The extension data in the device object that references a validation table will be used when no parent file object is specified on a create operation. Otherwise, the parent file object context information will indicate the correct validation table.

FIG. 4B shows a driver object 80 which has a particular device extension area 82 that can be utilized as desired by the driver developer and includes driver specific information. At a defined location within the device extension area 82 of the driver object 80 is a reference to a data structure, known as a file type validation table 84, containing string representations of file object types 86 and references to the associated create handlers 88 for each file type represented. The create multiplexing dispatch function will the utilize file type validation table 84 to validate the file object type to be created and then turn control over to the appropriate create handler as will be explained in detail hereafter in connection with the discussion of FIG. 6. The string to be validated is found in the IRP create request and originates from the file name string used with the NtCreateFile function call in user mode. The NtCreateFile call is made within the user mode function cell to create a pin instance or other mechanism.

FIG. 4C shows a file object 90 having a file context area 92 that is free to be used by the software driver developer. Reference is made from the file context area 92 to an IRP request handler table 94. The different types of IRP request 96 are associated with references to particular handlers 98, and the appropriate multiplexing dispatch function will use this information to access the correct handler. In the case of determining the correct create handler, a data structure known as a file type validation table 100 is referenced having string representations of file object types 102 and references 104 to the associated create handlers for each file type represented. For children file objects (i.e., file objects that have another file object rather than a device object as parent), the type is represented by a string that is compared to the strings in the file object types 102. When a match is found, the associated create handler is accessed using a reference from the references 104 that is associated with the matched file object type string. If no match is found, then the request is invalid and an error indication made.

Figure 5:
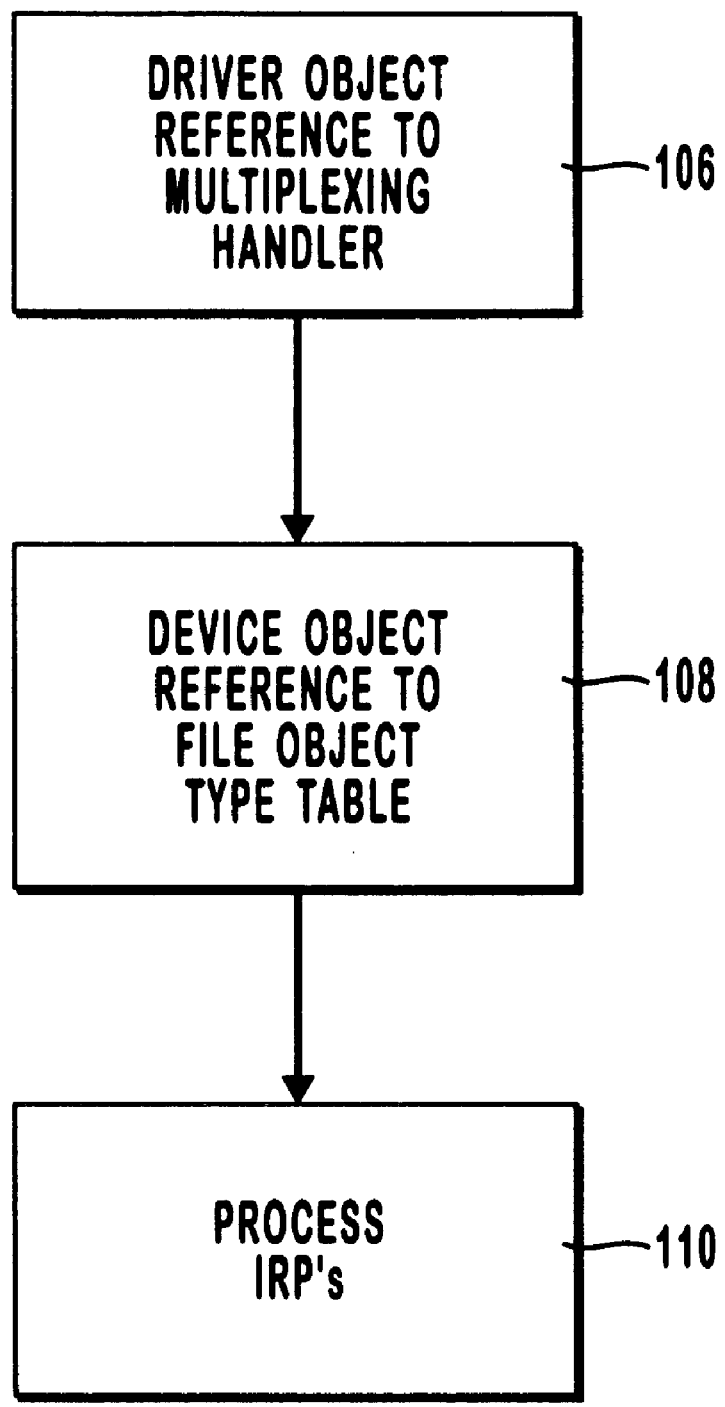
FIG. 5 is a flowchart showing the initial set up of the routing and validation componentry and the processing of I/O messages by the kernel mode drivers.

Referring now to FIG. 5, the installation procedure for setting up the creation validation and mechanism is shown. At step 106, the installing program will make reference in the driver object to the appropriate multiplexing dispatch functions. As shown in FIG. 4A, the create handler points to a generic mulitplexing dispatch function. In like manner, all other handler references in the driver object 76 would point to other generic multiplexing dispatch functions germane to the particular handler as necessary. Alternatively, each handler reference could point to the same multiplexing dispatch function that could in turn process the IRP request and route it to the appropriate handler. Such an alternative multiplexing function will necessarily be more complex in order to accommodate different kinds of request (e.g., create, write, etc.).

Next, at step 108, each device object created as part of the software driver executable code installation will be adjusted to reference the file type validation table 84 as shown in FIG. 4B. Finally, at step 110, the processing of IRP requests will begin with the multiplexing dispatch function using the file type validation table 84 as referenced from the appropriate device object 80.

When a file object is created, the appropriate IRP dispatch table 94 will be created and referenced along with the indexed file object type validation table 100 as necessary. The creation of the file object type validation tables occurs within the provided create handlers according to file object type. The data structures are created representing the IRP dispatch table 94 and the file object type validation table 100 and a reference thereto stored at a specific location with the file context information 92 of the particular file object 90 being created.

Figure 6:
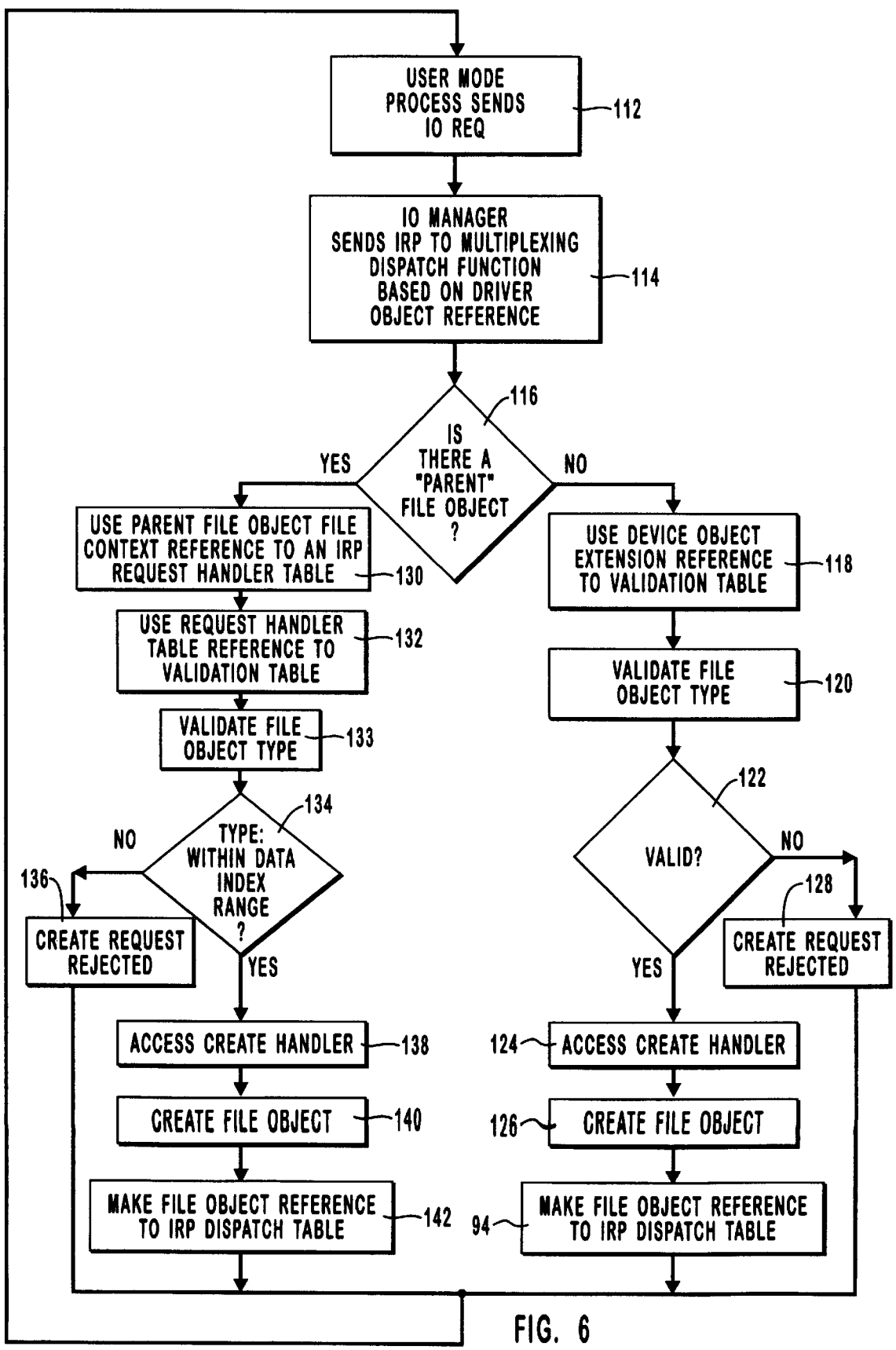
FIG. 6 is a flowchart showing in more detail the processing of a controlling agent, the routing and validation mechanisms, and specific create handler routines for creating a new file object.

Referring now to FIG. 6, a flow chart is presented showing the operation of the create multiplexing dispatch function and its validation mechanism including its interaction with the data structures referenced from the system driver objects, device objects, and file objects. At step 112, a user mode process sends an I/O request for creating a file object. This I/O create request is made using an invocation to the system API for NtCreateFile. At step 114, the I/O manager sends the IRP to the multiplexing dispatch function 78 based on the reference in the driver object 76 (see FIG. 4A).

Once the multiplexing dispatch function 78 has the IRP for the create request, a test is made at step 116 to determine if there is a parent file object. The information necessary to make this determination will be found within the IRP itself and originally be supplied by the user mode process. The user mode process will supply a handle referencing the "parent" file object as part of the create request and the NT system will create the IRP having the correct reference to the "parent" file object.

If there is no parent file object, the right branch is taken, and the multiplexing dispatch function 78 uses the device extension 82 from the appropriate device object 80 to reference a file type validation table 84 (see FIG. 4B) at step 118. Using the validation table 84, the multiplexing dispatch function 78 will validate the file object type at step 120 by comparing the string in the request with the file object types 86 strings.

If there is a matching string as determined at step 122, the appropriate create handler is accessed at step 124. Otherwise the create request is rejected at step 126. The create handler as accessed at step 124 will create, or cause to be created, the file object at step 126. With the created file object, the appropriate create handle will make the file object reference in the file context 92 to an IRP dispatch table 94 that it has previously created.

Again at step 116, it may be determined that there is a parent file object present. If a parent file object is present, as determined at step 116 as found in the IRP associated with the create request, the multiplexing dispatch function 78 uses the file context 92 from the parent file object 90 to reference an IRP dispatch table 94 (see FIG. 4C) at step 130. For a create request, the multiplexing dispatch function 78 will access a file type validation table 100, at step 132. Using the file type validation table 100, the multiplexing dispatch function 78 will validate the file object type at step 133 by comparing the string in the request with the file object types 102 strings, as was done above.

If there is a matching string as determined at step 134, the appropriate create handler is accessed at step 138. Otherwise the create request is rejected at step 136. With the appropriate create handler, the file object is created at 140, and the create handler will make a new IRP dispatch table 94 for the newly created file object and will make reference in the newly created file object 90 file context area 92 to the newly created IRP dispatch table 94 at step 142. Note that the same file object structure as shown in FIG. 4C is used to explain interaction with both the parent file object and the validly created child file object. While the same structure exists in both cases (once the new file object is created), they will be used differently and contain different information.

Whenever a connection pin instance is created, a connection pin ID is passed that identifies the pin factory in the filter that "supports" the creation of the pin instance. Those skilled in the art will note that the connection pin ID may also be validated as a string in a validation table in much the same manner as the file object is validated and that other implementation variations exist.

In order to make connections between different drivers, a common mechanism must be present to assure that a given driver supports such interconnections. This common mechanism must allow discovery of filter capabilities including connection pin factory capabilities. Furthermore, such a mechanism should also be extensible to provide additional flexibility to driver developers.

One mechanism chosen in the present embodiment for defining compliant drivers and allowing discovery of capabilities are identified "sets" of related items. This is a convenient mechanism to be used with existing I/O communication mechanisms. A set is logically defined as having a GUID (globally unique identifier) to identify the set as a whole and a RUID (relatively unique identifier, e.g., relative within the set itself) for each element of functionality within the set. The set identifier and any other data structures necessary for operating with the chosen RUID item are passed as part of an I/O control call using the filter handle as a parameter. Only a small number of IOCTLs need to be allocated in order to implement a full system of functionality. As implemented, three different types of sets are established depending on their functions, requiring a total of four IOCTLs. Other implementations may use sets in a different manner. The particular IOCTL will signal the handler for I/O control to interpret or use the chosen element (using the RUID) in a certain manner. Furthermore, control flags may be passed with the GUID and RUID to further specify control information.

The first set type is a property set and is used in connection with values or settings found within the driver or on any associated hardware. Examples of such settings would be transfer rate, volume level, etc. One IOCTL is associated with property sets with a control flag differentiating between a "get" property and a "set" property command. In this manner the same data structure can be used to either set or get a particular property with the driver determining the action required based on the IOCTL used. The correct property is identified by the set identifier consisting of its unique GUID and RUID combination.

Method sets are another type of set used and are a set of actions that can be performed by a driver. Only one IOCTL is needed to identify the method set with the correct method to be actuated identified by the unique GUID and RUID combination for the set identifier. Methods are used to control the driver and include such functions as initializing the driver for use, clearing buffers, etc.

Event sets are used for managing events associated with driver processing, such as device change notification, data starvation notification, etc., or any other notification defined by the set that may be useful to a user mode application. Two IOCTLs are used, one for enabling a specified event and one for disabling a specified event, while any data structures necessary for a given event identified by a RUID can be shared whether enabling or disabling the event.

To use a set, an I/O control operation is initiated using the specified IOCTL and reference to a data structure having the set GUID, RUID, and other necessary data (e.g., control flags, data structures, etc.). For example, setting a volume property on a sound card driver would entail an I/O control operation using a property set IOCTL, a control flag indicating a set property operation, the appropriate GUID for the property set having the volume setting, the specific RUID within that set indicates the volume property, and the new volume setting value.

To query the sets supported, by type, an IOCTL for a particular set type (e.g., property IOCTL, method IOCTL, or event enable IOCTL) having a null GUID and control flags to indicate supported set enumeration are issued as part of an I/O command and a list of set GUIDs supported will be returned. To query supported properties, methods, or events within a given set, the set GUID, set type IOCTL, a null RUID, and control flags indicating enumeration of supported elements are used with the I/O operation. A list of supported RUIDs will be returned as a result of the I/O operation. This will allow a third party agent to determine which, if any, optional elements of an implemented set are supported.

The written specification of a set uniquely identified by a GUID allows a documented mechanism that both driver developers and third party controlling agents may use as an implementation guide. The third party developer will know of a given driver's capabilities based on response to queries and preprogrammed knowledge based on the abstract set definition. Likewise, a driver developer may use the abstract set definition as a guide to implementing a set or group of sets providing known functionality to any third party agent.

In order to provide the connection abilities described herein, a compliant driver must support certain sets. The following tables illustrate some important kinds of information that may be supported in property set format and that can be used in implementing the present invention. The first table refers to properties about a connection pin factory that would be implemented by a filter, while the second table refers to properties about an actual connection pin instance that would be created by using a particular connection pin factory as a template.

TABLE 1

Filter Properties and Their Use

| Property | Description |
| --- | --- |
| Connection Pin Factories | Lists the different types of connection pin instances that may be created on a particular filter, each distinguishable type referred to as a pin factory. Note that this is not the total number of connection pin instances which could be instantiated on this device, but the |

TABLE 1-continued

Filter Properties and Their Use

| Property | Description |
| --- | --- |
| | number of unique connection pin types, such as an audio input and audio output. |
| Connection Instances | Lists the number of instances already created of a given connection pin factory as well as the highest number of instances supported for that particular connection pin factory. If the total cannot be determined until the filter is actually connected, this property will return a −1. |
| Data Flow | Lists the possible data flow direction of a connection pin factory with respect to a filter (e.g., into the filter, out of the filter, or either into or out of the filter). |
| Communication | Lists the communication requirements for a given connection pin factory in terms of processing IRPs. Some connection pin factories may not be interconnected but have other forms of control mechanisms associated therewith such as a "bridge" to a file source for data that represents a source point on a graph. The bridge control mechanism would allow setting of a filename indirectly where information is stored.<br>In an exemplary implementation, an agent (which decides which pin factory to use for making a connection pin instance) must be able to understand the intrinsic meaning of a "none", "sink" or input, "source" or output, "both," and "bridge" communication types for a connection pin factory. For example, a source connection pin instance requires a handle or reference to a sink connection pin instance, etc.<br>In the communication type context, sink and source refer to the disposition of the connection pin instance in processing IRPs. A sink would receive the IRPs for processing, while a source would pass the IRPs onto the next appropriate processing component. There are two communication types that are neither sink nor source and represent end points in the connection graph. An end point represents the place where data either enters or exits from the connected filters. A none designation indicates that the connection type may not be instantiated while a bridge communications type refers to an end point that may be instantiated so that specific properties may be manipulated. For example, a bridge end point that is part of a file reader will likely have a property that will contain the path and file name of a file that stores the data to be processed. |
| Data Ranges | Lists the possible data ranges that a connection pin factory may support, including the format of the data, if relevant. In one implementation, a count followed by an array of data ranges, which the connection pin type may support, is used as part of the property. In that implementation, if different data ranges are supported under different mediums or interfaces (see below), different connection pin factories are available on a particular filter to accommodate such differences. Furthermore, each data range structure may be extended for format specific detail such as number of bits and channels.<br>The actual data format a connection pin instance uses is set during creation of the instance. The data range property is used to assist in determining what that actual data format should be for a particular connection pin instance and is accessed or queried by a third party controlling agent. |
| Interfaces | Lists other set GUIDs indicating the supported interfaces on a particular connection pin factory. An interface is the type or types of data that may be communicated through a connection pin factory. For example, MIDI data, CD music, MPEG video, etc., would be interfaces in the sense that data has a particular convention and format that a filter could handle. Such interfaces also comprise protocols for submitting the data. An interface is independent of the medium by which it is communicated. |
| Mediums | Lists the supported mediums on a particular connection pin factory. A medium is the way or mechanism by which information is transferred, such as IRP-based, sockets, etc. An interface may be defined on top of a variety of different mediums. In the preferred embodiment and implementation explained herein, an IRP-based medium and file IO- based medium is used. |
| Data Intersection | Returns the first acceptable or "best" data format produced by a connection pin factory given a list of data ranges. This approach is used to allow a third party agent to determine data requirements when chaining different filters together. In one implementation, the data intersection property is used to determine the best data format produced by a connection pin factory given the constraint of a list of data ranges. The list of data ranges may be acquired using the data ranges property on another pin factory that will be connected as |

TABLE 1-continued

Filter Properties and Their Use

| Property | Description |
|---|---|
| | explained previously.<br>A third party controlling agent, which has no knowledge of the data type specifics, may use the data range list of one connection pin factory and return the "best" (e.g., first acceptable data format) data format on the current connection pin factory. Although a set of ranges of the two intersecting connection pin factories could be returned, only the best format is returned by the driver. In this manner, the third party controlling agent can apply this "best" data format to the next driver in the graph in order to create a virtual set of connections before actually initiating the creation of connection pin instances and connecting the entire graph of filters together. This allows the controlling agent to assess the viability of a particular filter graph selected by a user and point out potential problems to the user before actually connecting the graph. The data format returned can also be restricted by the formats available given the connections already made on the filter.<br>This property is capable of returning an error if a particular data format cannot be determined until an actual connection is made or if an intersection is dependent on multiple data formats on different connection points. Essentially, intersection information is provided while the property itself will return a data format. |

TABLE 2

Connection Pin Instance Properties and Their Use

| Property | Description |
|---|---|
| State | Describes the current state of the connection pin instance. Possible states include being stopped, acquiring data, processing data, being paused or idle, etc. The state represents the current mode of the connection pin instance, and determines the current capabilities and resource usage of the driver. The stop state is the initial state of the connection pin instance, and represents the mode of least resource usage. The stop state also represents a point wherein there will be the most latency in data processing in order to arrive at the run state. The acquire state represents the mode at which resources are acquired (such as buffer allocators) though no data may be transferred in this state. The pause state represents the mode of most resource usage and a correspondingly low processing latency to arrive at a run state. Data may be transferred or "prerolled" in this state, though this is not actually a run state. The run state represents a mode where data is actually consumed or produced (i.e., transferred and processed) at a connection pin instance. More resolution in control may be accomplished using custom properties depending on the purpose of the filter and the underlying hardware. For example, in order to make an external laser disk player spin up, one would set some sort of custom "mode" property specific to that class. Setting this property may also change the state of the device but not necessarily, depending on the effect of the mode. |
| Priority | Describes the priority of the connection pin instance for receiving access to resources managed by the filter and is used by the filter in resource allocation arbitration. This property, if supported, allows a third party controlling agent to indicate the priority placement of the particular pin instance relative to all other connection pin instances of all other drivers which may share limited resources with this particular connection and instance.<br>This priority property may also be implemented to allow an agent to set finer tuning of the priority within a single class of priority. For example, a priority may have certain subclasses associated therewith. If two drivers competing for the same resources have the same priority class, then the subclass priority is used to determine resource allocation between the two drivers. If the subclass priority is also the same, then arbitrarily, the first connection pin instance will receive the resources. |

TABLE 2-continued

Connection Pin Instance Properties and Their Use

| Property | Description |
|---|---|
| Data Format | Used to get or set the data format for the connection pin instance. |

The previous tables are given by way of example and not by limitation, and those skilled in the art will appreciate that many different properties and schemes may be implemented in order to create the connections between different drivers. One important element is the standardization factor so that different driver manufacturers or development groups may create drivers that may be interconnected since they are able to implement the same property sets.

Another useful property set gives topology information for the internal relationships of input and output connection pin factories on a given filter. This information will state the relationship of input pin factories and corresponding output pin factories on a given filter as well as what type of processing happens between the input and output pin factories. Examples of the processing that occurs would be different data transformations, data decompression, echo cancellation, etc. Such information is useful to an automated filter graph builder that will trace a hypothetical connection path using multiple filters before making actual connection pin instances and connections. Essentially, the topology information explains the internal structure of the filter and exposes this through a property set mechanism to inquiries from third party agents.

Therefore, a compliant driver is simply one that implements the designated property set. This allows a third party controlling agent to make queries and settings to the compliant filter once it is determined that a given property set is supported. The overall goal is to acquire enough information on how to connect the differing filters together in order to form a filter graph.

By using the generic set mechanism, a minimum of functionality may be implemented to support a compliant driver but still allow unlimited extensibility. A set may be defined in a written specification that can be independently coded by a multitude of different driver developers to create a system of interoperable and interconnectable drivers as long as particular sets are implemented. Furthermore, the specification can define mandatory properties, methods, and events that must be supported as well as optional properties, methods, and events that can be implemented depending on the driver functions and advanced capabilities. Besides the basic minimum commonality required, driver developers may incorporate additional functionality by defining their own sets and assigning them a GUID.

Figure 7:
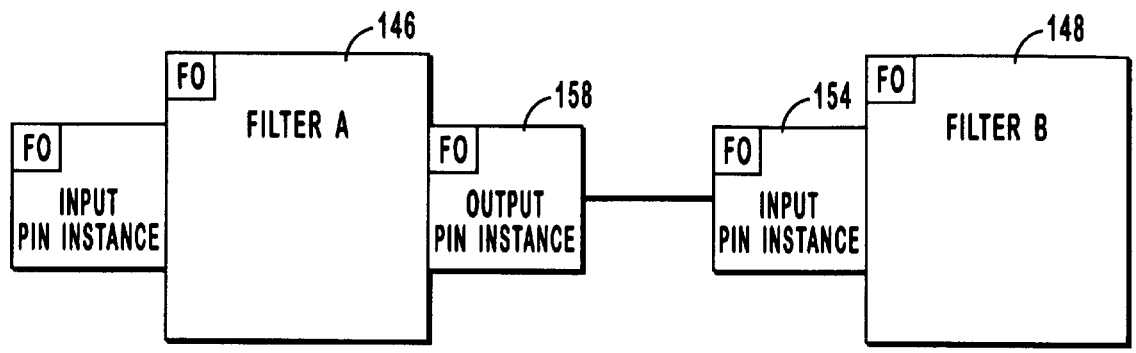
FIG. 7 is a logical diagram showing the horizontal relationship between connected filters utilizing the file object structures in an operating system to effectuate such a connection in a standardized fashion.
Figure 8:
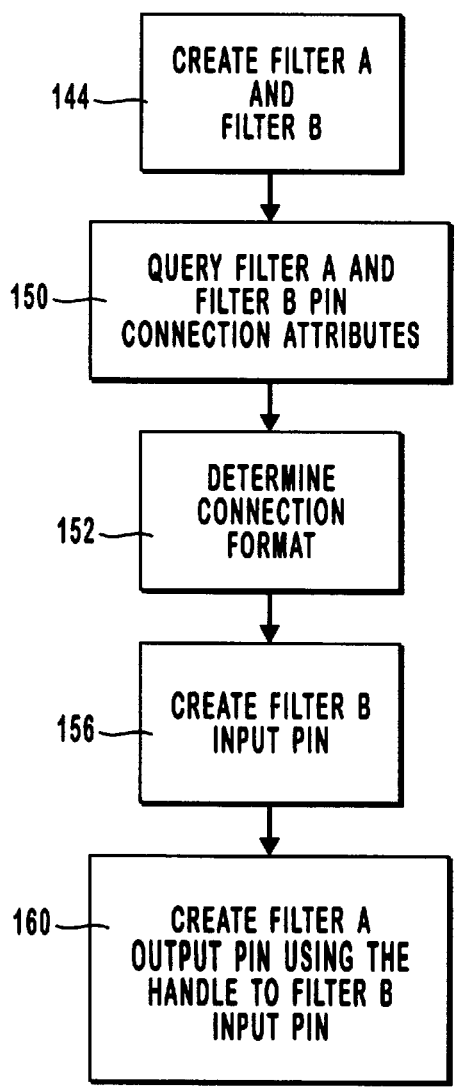
FIG. 8 is a flowchart showing the processing steps taken by a controlling agent in user mode to create and connect the kernel mode filters or drivers of FIG. 7 in order to effectuate a connection for processing I/O requests received from the controlling agent with processing continuing between different drivers (filters).

Referring now to FIGS. 7 and 8, an illustration of the process for connecting two kernel mode filters is illustrated. FIG. 7 shows a logical block description wherein each filter instance and connection pin instance is represented by file objects. FIG. 8 is a flow chart illustrating the steps to creating the file objects and the appropriate connections.

Beginning at step 144, an instance of Filter A 146 and an instance of Filter B 148 are created by a user mode agent. These are created using standard file system API for creating files with a particular device. Filter A 146 and Filter B 148 will be compliant filters or drivers because of their implementing the appropriate property, method, and event sets to support the creation of connection pin instances and for querying the respective filter's capabilities in terms of sets supported and connection pin factories defined for that filter.

The third party controlling agent will then query Filter A 146 and Filter B 148, respectively, at step 150 to determine connection pin factories available and the attributes for connection pin instances that may be created therefrom. These attributes include, as mentioned previously, the connection format and the data format for each individual type of pin instance for each respective filter 146 and 148. The querying will be accomplished using the set based query mechanisms explained in detail previously.

After querying such information, the third party controlling agent will determine the optimal connection format based on the ranges of data formats and connection formats previously queried. This determination occurs at step 152 and places in the third party agent the ability to use the same filters in different ways according to the needs of a selected connection path. The third party controlling agent will use the data intersection property, topology information, and connection pin factories on both the filters in order to determine how best to select data format and connection arrangements depending on the actual filter graph being made.

Input filter pin instance 154 is created by the third party agent at step 156 using the optimal detection formation determined at step 152. Since input pin instance 154 is a file object, a handle will be returned from the create process that can be used for delivering I/O requests to the input instance 154. Furthermore, the creation of the input pin instance 154 was validated and uses the routing and validity mechanisms shown previously in discussion with FIGS. 4A–4C, 5, and 6.

In order to finalize the connection, output pin instance 158 is created at step 160 using as a parameter in the NtCreate-File call the handle of the previously created input pin instance 154. The effect of thus creating the output pin instance 158 is to utilize the system file management and I/O management facilities to create an internal IRP stack structure that allows an original write command to be consecutively processed by the variously connected connection pin instances and filters in an appropriate order so as to facilitate direct data flow between the differing filters. This requires that the input pin instance be created prior to the associated output pin instance that will be feeding the input pin instance.

The stack depth parameter of a device object controls how many stack locations are created for an IRP sent to this driver. A stack depth parameter is assumed to be one when a device object is initially created and may be modified thereafter depending on the whether multiple drivers are chained together. In the current system, modification occurs, if necessary, when an output pin instance transitions from the initial "stop" state to the "acquire" or other state. Connection pin instance state transition is the mechanism that determines correct stack depth parameter information for proper IRP creation and treatment.

In order to correctly allocate the internal IRP stack structure for a chained set of connection pin instances, it is necessary to transition the connection pin instances out of the stop state in a specified order; beginning with the last input pin instance (in this case input pin instance 154) and working consecutively backwards to an associated (e.g., connected) output pin instance (in this case output pin instance 158). If many filters are chained together, the deepest filter's or bridge's input pin instance must be the beginning point of transitioning and building successively backwards until the initial output pin instance on a bridge or filter is set. In other words, the transition out of the stop state must occur backwards up the chain so that each connection pin instance gets the stack size needed after the previous connection pin instance. Typically, though not necessarily, a connection pin instance transitions from the stop state to the acquire state and for discussion purposes hereinafter transitioning to the acquire state will accomplish the same purpose with respect to stack depth parameter adjustment as transitioning out of the stop state.

Once all pin instances are in the acquire state, stream reads and writes may be issued to the filter graph. It is interesting to note that the system explained herein allows connection of associated input and output pin instances to occur in any order; only the transition from the stop state must occur in bottom up or deepest first fashion. Furthermore, the filter graph is reconfigurable to allow changes to be made after initial creation. When changes are made, state transitions need only occur on those connection pin instances that are in the stop state in order to assure correct stack depth parameter information.

Connection pin factories found on filters represent places where a filter can consume and/or produce data in a particular format. For example, a particular connection pin factory may support a number of different data formats, such as 16 bit 44 kilohertz PCM audio or 8 bit 22 kilohertz PCM audio. As explained previously, the connection pin factories and their different capabilities such as data format can be queried from the filter using the appropriate property set mechanism and the system I/O facilities. Actual connection pin instances are created based on the information received from the pin factories.

In a streaming environment, where a single stream write or stream read operation from a user mode agent will cause successive processing of the data through the connected filters, two main methods for IRP control can be used as part of the native facilities of the NT operating system. First, a separate IRP may be created by each filter and sent to the next filter for processing which will in turn create a new IRP for further processing down the chain. The other method is to use a single IRP and pass it between the successive filters using standard procedures provided for interacting with the I/O manager. If the first method of creating new IRPs for each successive filter in the chain is used, interconnection order between the filters is unimportant since the filter need only know the destination of the IRP in order to call the I/O manager and send the IRP to the designated filter. If an IRP is reused, it is important that the connection pin instance transitions from the stop state be made beginning from the last filter to receive the reused IRP for processing backwards up to the first filter to receive the reused IRP or to the filter that created the IRP for processing.

The current embodiment and implementation of the interconnected kernel mode filters utilizes IRP sharing advantageously to ease complexity in driver development, allow more robust drivers to be created, and provide more efficient processing. The "bottom up" pin instance state transition path will ensure that the proper stack order is created in the IRP processed by the successive drivers and that each driver object has the appropriate stack depth parameter set. Furthermore, the current state of the receiving input pin instance is checked in order to assure that the state transition sequence has been properly followed. For this reason, the communications property of a particular connection pin factory will determine the potential flow direction and aid in properly distributing the state transition of connection pin instances.

When creating an output pin instance (or IRP source), a reference to a file object representing an input pin instance (or IRP sink) on another filter will be passed as part of the NtCreateFile call. The appropriate create handler will be executed as explained previously using the multiplexing dispatch function and device object/file object hierarchy. This create handler will have access to the device object of the filter having the input pin instance (e.g., Filter B 148 in FIG. 7) by way of the input connection pin instance file object (e.g., input pin instance 154). From the device object, the previous stack depth parameter can be read, and the stack depth parameter of the device object for the filter having the output pin instance may be incremented. For example, the device object associated with Filter A 146 will have a stack depth parameter incremented from that of the device object associated with Filter B 148 for the connection illustrated in FIG. 7. This normally occurs when transitioning out of the stop state and IRPs are not forwarded while a connection pin instance is in the stop state.

When a filter processes an IRP, it knows which stack frame or location within the IRP stack to access containing information designated for that particular filter by making reference to and using the stack depth parameter of the associated device object. Furthermore, the current filter will prepare the IRP for the next filter in the processing chain by decrementing the device object stack depth parameter to locate the next filters IRP stack location.

The filter code is responsible for preparing the next location in the IRP stack and for calling the I/O manager to pass the IRP to the next filter as designated. In this manner, the filter may designate which file object representing a particular connection pin instance is to receive the IRP and the associated data for processing. Hence, the standard I/O manager calls such as IoAttachDevice to stack the respective device objects for sequential processing of IRPs are not used.

It is noteworthy that creating a connection between connection pin instances does not imply creating new device objects to represent the connection. A single underlying device object is used to support an instance of a filter and all connection pin instances on that filter. Specific information necessary for proper data processing is kept within the context area of the file object allowing the context information to be preserved while non-page memory use is kept at a minimum. It is also noteworthy that while an IRP-based medium has been illustrated, other mediums for communication between the interconnected filters may be used, such as direct function calls on non-host hardware-to-hardware communication.

Figure 9B:
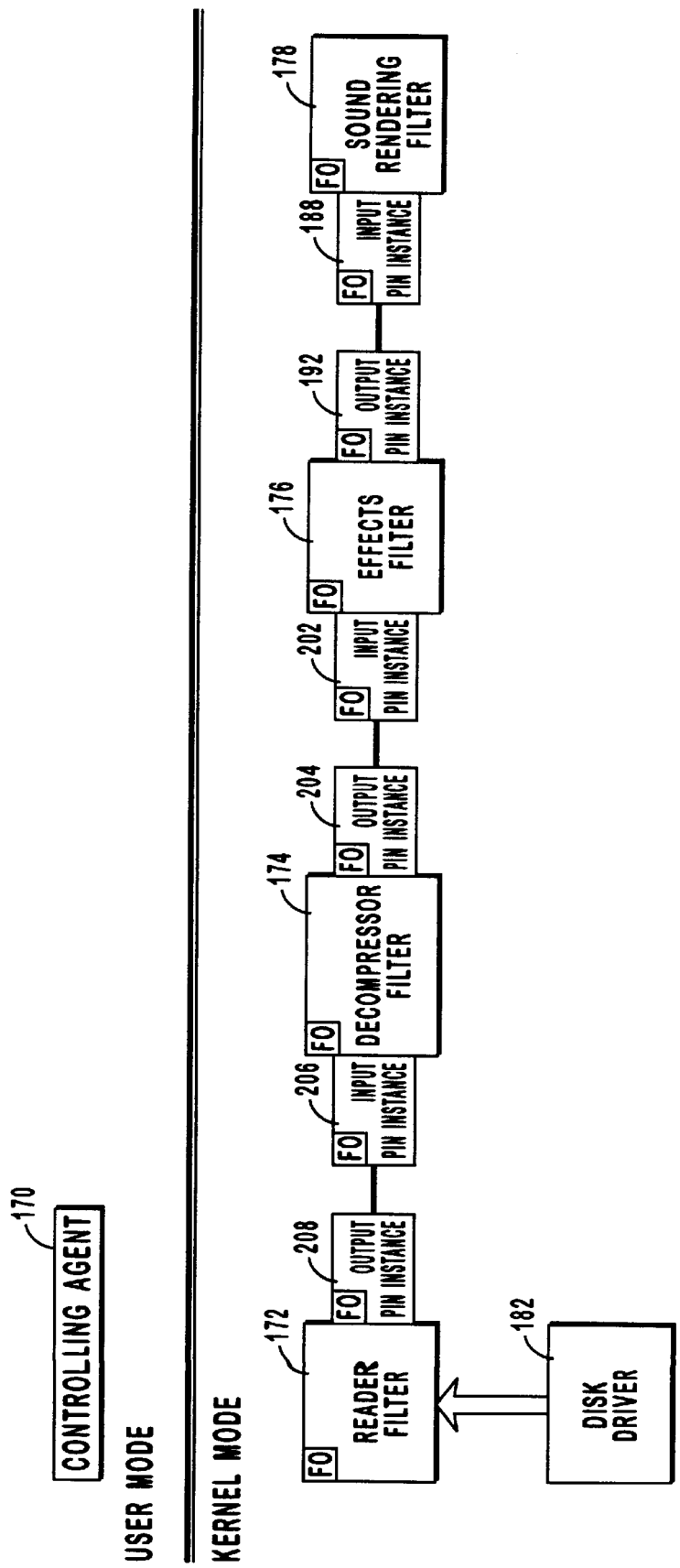
Figure 10:
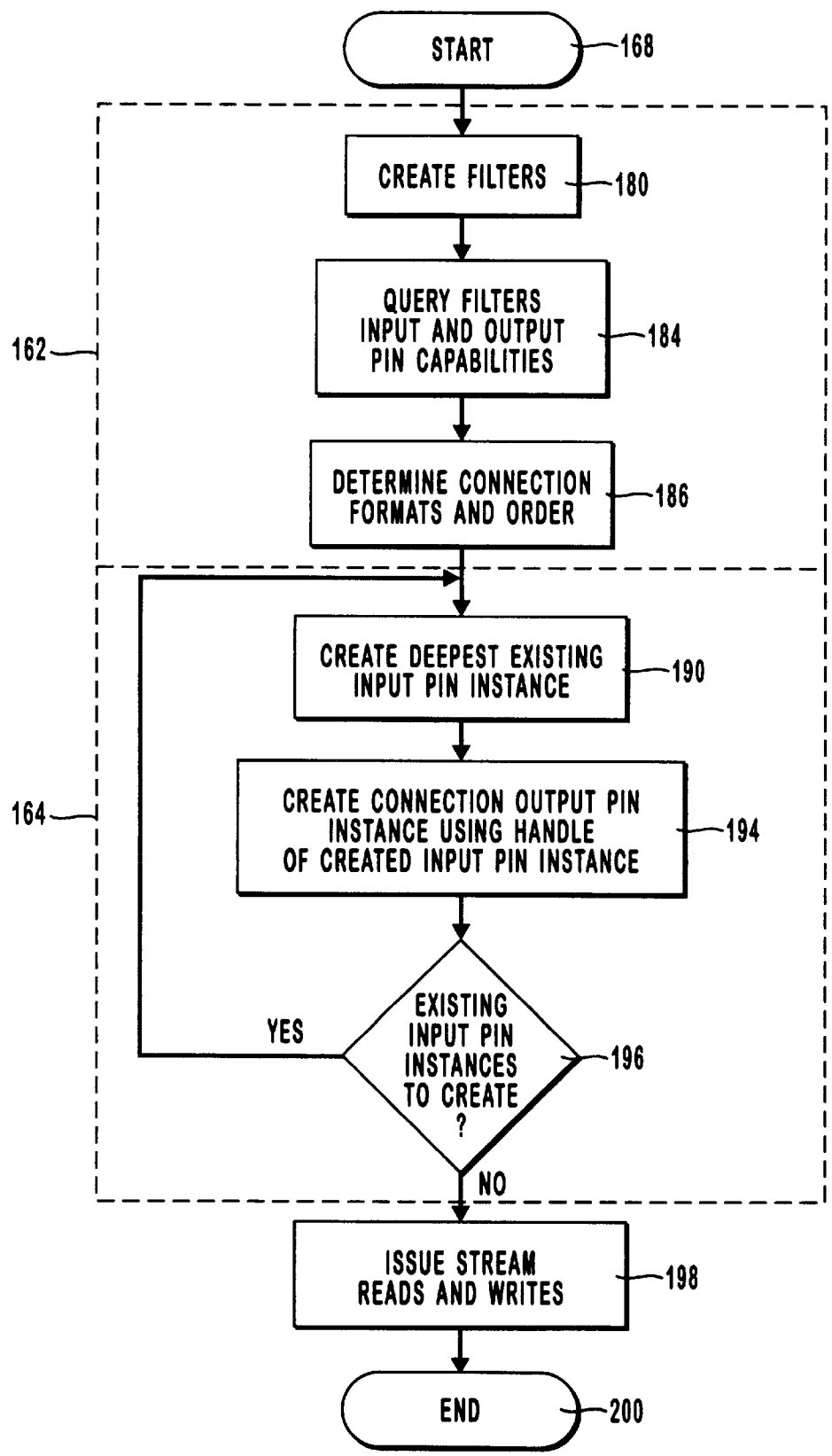
FIG. 10 is a flowchart showing the processing steps for creating the interconnected kernel mode drivers for the system shown in FIGS. 9A and 9B.

Referring now to FIGS. 9A–9B and FIG. 10, the proper creation, connection, and state transition order of the software drivers as shown in FIG. 1 (prior art) and FIG. 2 (higher level logical diagram of the interconnected kernel mode drivers) are presented. FIG. 9A illustrates the logical structure encompassed by box 162 and the processing steps contained therein. FIG. 9B shows the creation of the connection pin instances to complete the interconnection of kernel mode filters and comprises the processing steps encompassed by box 164 on the flow chart shown in FIG. 10.

When in the state of FIG. 9B, having all interconnections made, the kernel mode filter system is ready for reads and writes in order to effectuate processing. The I/O system will use the IRP stack information properly set by the correct state transition process in order to pass the stream reads and writes onto the differing filter elements by way of their respective connection pin instances. It may be noted that some external software other than the agent used to create the graph, including a bridge or filter itself, as well as hardware will provide data for the stream reads and rights.

After beginning at step 168, the controlling agent 170 will create instances of reader filter 172, decompressor filter 174, effects filter 176, and sound rendering filter 178 at step 180. Furthermore, attachment will be made between reader filter 172 and a disk driver 182 in order to bring the data in from off of the disk drive. Creation of each filter instance is achieved by the user mode controlling agent 170 by using standard I/O calls to open a file on the appropriate device as found in the device I/O directory hierarchy. Such a call will return a handle to a file object representing the instance of each filter.

At step 184, the third party agent will query the effects filter 172, the decompressor filter 174, the effects filter 176, and the sound rendering filter 178 to determine the connection pin factory capabilities. These capabilities include what kinds of input and output pin instances may be created, how many instances of each connection pin factory the particular filter will support, the data format supported on each connection pin factory, the medium or type of communication path, etc. The capabilities are "queried" using the property set mechanism explained in more detail previously and the kernel mode filters are presumed to be compliant to the architecture since they support appropriate "sets" (e.g., property set).

All such query information at step 184 will be used to determine if a chained connection path is possible between the respective filters by creating and connecting the appropriate connection pin instances. The third party agent will determine the types of pin instances needed for interconnection in order to make a filter graph to accomplish a given purpose.

The determination of the connection format based on the supported data formats is determined at step 186. Using the topology information, data format, and data intersection properties on the filter, a hypothetical filter graph may be created. Since connection order is not significant, this need not be done but could save time when trying to build a filter graph. Should this hypothetical filter graph be created without error, the third party agent will be assured that creating an interconnecting connection pin instances can be done with reliability. Because some queries will return errors unless an actual pin instance is created, it may be necessary to create such connection pin instances before a hypothetical filter graph can be created that will return a reliable indication of viability. Again, the hypothetical filter graph may be tested before any interconnections take place.

Once the correct connection information is known, as determined at step 186, the input pin instances may be created and interconnected and as represented by the loop of processing steps enclosed by box 164 on FIG. 10. This loop contains processing steps that will begin at the input pin instance furthest away from the source of the data stream. This last input pin instance is referred to as the "deepest" pin instance and may be created first, followed by the output pin instance associated therewith. A connection, therefore, is the creation of an output pin instance using the handle of a previously created input pin instance.

The pattern continues, with every input pin instance created successively afterwards prior to connection with the associated output pin instance. Such a connection scenario is given by way of example and is not to be limiting of other possible ways of connecting the respective output and input pin instances to form a connection between kernel mode filters according to the present system. The filters may be connected in any order according to implementation as long as the handle from the input pin instance is used during creation of the connected output pin instance on another filter. Furthermore, as explained previously, changes may be made to the filter graph after initial creation (and even use).

In the first iteration of the loop, input pin instance 188 will be created at step 190. After receiving the handle from the create function, the third party controlling agent 170 will use that handle as a parameter in an NtCreateFile call in order to create output pin instance 192 at step 194. By doing this through the first iteration, the sound rendering filter 178 is effectively connected to the effects filter 176 through the corresponding connection pin instances 188 and 192, respectively. In the current implementation, the NtCreateFile call is "wrapped" as part of a function call in an API made available to the user mode clients. This relieves the user mode developer of third party agents from needing to know as much detail and allows all relevant functionality be concentrated in a single user mode API.

At step 196, the third party agent determines if there is any other existing input pin instances to be created. If there are, an input pin instance must be created followed by the corresponding output pin instance on another filter. Eventually, all connections will be made and the third party controlling agent 170 will prepare the filter graph for streamed data processing.

In this fashion, input pin instance 202 will be created on the second iteration of the loop enclosed in box 164 at step 190 while the output pin instance 204 will use the handle of input pin instance 202 as part of its creation at step 194. Finally, on the third and final iteration for this particular example, input pin instance 206 will be created followed by output pin instance 208 to finalize the connection.

At step 197, the third party controlling agent 170 will transition each connection pin instance from the stop state to the acquire state in preparation for streamed data processing through the filter graph. To correctly set the stack depth parameter in each of the device objects for the respective filters, it is necessary to make the state transition beginning with the "deepest" or last connection pin instance (e.g., the last input pin instance to receive data for processing) and sequentially moving "up" the chain of interconnected kernel mode filters until arriving at the first connection pin instance (e.g, the first output pin instance that will provide data into the graph). The first filter or bridge will create the IRP with enough stack locations allocated so that the IRP may be passed successively through each kernel mode filter in the graph in an efficient manner.

Finally, the third part controlling agent 170 issues the stream reads and writes in order to process the data at step 198 before ending at step 200.

As explained previously, each creation of an output pin instance will require the handle of a file object representing the input pin instance to be connected thereto. This file object reference will allow the create handler for the output pin instance to save a reference to the device object corresponding to the input pin instance for current or future access.

More particularly, this allows the stack depth parameter of the device object managing the input pin instance to be accessed by the driver of the output pin instance during state transition from the stop state to the acquire or other state. The value of the stack depth parameter associated with the input pin instance is accessed, incremented, and saved into the stack depth parameter for the device object corresponding to the output pin instance.

The stack depth parameter is used to determine where in the shared IRP stack structure the stack frame information is located for a particular filter and will be different for each filter. By so interconnecting the filters and making the state transition in proper sequence, a single IRP may be passed down the chain of interconnected filters in kernel mode with no necessary communication into user mode.

It may be noted that it is possible to have multiple instances based on the same connection pin factory. For example, an audio mixing filter may mix multiple input pin instances into a single output pin instance in terms of processing. Each input instance is of the same type and the filter may only support one type of input pin. Such an arrangement would also be an example of having multiple inputs to a single output.

The converse is also true wherein a splitter filter may have a single input connection pin instance while providing multiple output pin instances thereby multiplying streams of data. Those skilled in the art will note that many variations and useful combinations can be made from the connection mechanism explained herein according to actual implementation and the needs thereof.

The uniformity and standardization achieved by requiring all compliant filters to support a common mechanism (e.g, property sets, methods sets, and event sets) that can be independently implemented by driver developers allows a controlling agent to conveniently connect compliant filters provided by various different software providers. Furthermore, many of the facilities in terms of connection pin factories needed in one circumstance may not be needed in another circumstance. A determination of the necessary connection pin instances is made initially by the third party controlling agent that makes the actual interconnections between different filters.

Those skilled in the art will recognize that the methods of the present invention may be incorporated as computer instructions stored as a computer program code means on a computer readable medium such as a magnetic disk, CD-ROM, and other media common in the art or that may yet be developed. Furthermore, important data structures found in computer hardware memory may be created due to operation of such computer program code means.

The present invention may be embodied in other specific forms without departing from its spirit of essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for interconnecting software drivers to allow efficient kernel mode processing of data comprising the steps of:

opening one or more kernel mode drivers, each of the kernel mode drivers having a separate device object associated with each function the kernel mode driver is capable of performing and each said device object being heirarchically related to its corresponding kernel mode driver;

forming one or more connection pin instances for connecting the device objects, each connection pin instance hierarchically related to one of said one or more device objects and used for data transmission between said one or more device objects; and interconnecting said one or more connection pin instances so as to provide a continuous data flow path through said one or more device objects operating in kernel mode, wherein the data is consecutively processed by said drivers in kernel mode without resort to a user mode agent to directly control or coordinate the intermediate transfer of data from one kernel mode device object to the next kernel mode device object.

2. A method as recited in claim 1 wherein each connection pin instance is represented by a file object heirarchically related to its associated device object, the device object referenced as a file object of an I/O device available on the system, as a parent during connection instance file object creation.

3. A method as recited in claim 1 further comprising the step of querying each of said one or more drivers to determine the type of connection pin instances supported prior to creating and interconnecting said one or more connection pin instances.

4. A method as recited in claim 1 wherein said one or more drivers support at least one predefined set of properties, set of methods, and set of events to indicate to a third party component what types of connection pin instances and data formats are supported by a driver and for allowing a third party component to form said connection pin instances and to make said interconnections between said connection pin instances.

5. A method as recited in claim 1 wherein said connection pin instances include input pin instances to receive data for processing at the related device object, output pin instances to send data from the related device object to a connected device object, and bi-directional pin instances that both receive data for processing at the related device object and send data from the related device object to a connected device object.

6. A method as recited in claim 1 wherein said interconnecting step comprises, for each pair of interconnected pin instances, the steps of:

receiving, by a third party component, a first reference to a first connection pin instance related to a first device object;

receiving, by a third party component, a second reference to a second connection pin instance related to a second device object;

passing said first reference, by said third party component, to said second connection pin instance at said second device object; and passing said second reference, by said third party component, to said first connection pin instance at said first device object, said first and second connection pin instances to transfer data back and forth between connected respective first and second device objects.

7. A method as recited in claim 1 wherein said interconnecting step comprises, for each pair of interconnected pin instances, the steps of:

receiving, by a third party component, a reference to an input pin instance, said input pin instance to receive data for processing at a receiving device object;

passing said reference, by said third party component, to an output pin instance, at a sending device object, said output pin instance to send data from said sending device object to said input pin instance of connected said receiving device object.

8. A computer-readable medium having computer-executable instructions for performing the steps recited in claim 1.

9. A computer program product for use in kernel mode comprising:

a computer usable medium having computer readable program code means embodied in said medium for providing a standardized interconnection mechanism between a plurality of kernel mode drivers, each kernel mode driver having a separate device object associated with each function the kernel mode driver is capable of performing and each said device object being heirarchically related to its corresponding kernel mode driver, said computer readable program code means comprising program code means for forming connection pin instances and program code means for interconnecting said connection pin instances so as to provide a continuous data flow path through said one or more device objects operating in kernel mode, wherein each connection pin instance is hierarchically related to each said device object and wherein the data is consecutively processed by said device objects in kernel mode without resort to a user mode agent to directly control or coordinate the intermediate transfer of data from one kernel mode device object to the next kernel mode device object.

10. A computer program product as recited in claim 9 further comprising program code means for generating information regarding connection pin capabilities in response to queries from other components.

11. A computer program product as recited in claim 10 wherein the program code means for generating connection pin instance information comprises implementing at least one of it set of properties, a set of methods, and a set of events to be accessed by another device object.

12. A computer program product as recited in claim 9 further comprising program code means for controlling a particular connection pin instance by another device object.

13. A computer program product as recited in claim 12 wherein the program code means for controlling a connection pin instance comprises implementing at least one of a set of properties, a set of methods, and a set of events to be accessed by another device object.

14. In a system having one or more kernel drivers wherein each kernel mode driver has a separate device object associated with each function the kernel mode driver is capable of performing and each said device object is heirarchically related to its corresponding kernel mode driver, a method of interconnecting a first kernel mode device object and a second kernel mode device object to allow said device objects to communicate with each other using a kernel mode connection in a standardized and extensible manner, the method comprising:

querying, by a third party component, said first and second device objects to determine what property sets the device objects support;

supplying, to said third party component by said first and second device objects in response to a query, the type of connections each device objects supports;

determining, by said third party component based on the supplied connection information, how to make a connection between said first and second device objects;

providing, by said third party component, a data format and a connection format to said first device object;

creating, by said first device object and in response to said third party component, an instance of said connection format to said first device object and a handle to the instantiated connection;

returning, by said first device object, said handle to said third party component; and providing, by said third party component, said handle to said second device object, wherein the data is consecutively processed by said device objects in kernel mode without resort to a user mode agent to directly control or coordinate the intermediate transfer of data from one kernel mode device object to the next kernel mode device object.

15. A kernel mode media rendering system comprising:

a media source;

a plurality of kernel mode drivers for processing media samples received from the media source, each kernel mode driver having a separate device object associated with each function the kernel mode driver is capable of performing and each said device object being heirarchically related to its corresponding kernel mode driver;

an originating device object reading media samples of a media stream from the media source;

a terminating device object rendering said media stream; and each device object having connection pin instances for passing media samples between the device objects; and kernel mode component interconnections between the device objects created using the connection pin instances to route the data samples from the originating device object to the terminating device object, wherein the data is consecutively processed by said components in kernel mode without resort to a user mode agent to directly control or coordinate the intermediate transfer of data from one kernel mode component to the next kernel mode component.

16. A method for interconnecting software drivers to allow efficient kernel mode processing of data comprising the steps of:

opening one or more kernel mode drivers, each of the kernel mode drivers having a separate device object associated with each function the kernel mode driver is capable of performing and each said device object being heirarchically related to its corresponding kernel mode driver and wherein each device object has a separate file object associated with each instance of said device object and each file object is hierarchically related to its corresponding device object;

forming one or more connection pin instances for connecting the file objects, each connection pin instance hierarchically related to one of said one or more file objects and used for data transmission between said one or more file objects; and interconnecting said one or more connection pin instances so as to provide a continuous data flow path through said one or more file objects operating in kernel mode, wherein the data is consecutively processed by said file objects in kernel mode without resort to a user mode agent to directly control or coordinate the intermediate transfer of data from one kernel mode file object to the next kernel mode file object.

* * * * *

UNITED STATES PATENT AND TRADEMARK OFFICE
CERTIFICATE OF CORRECTION

PATENT NO. : 6,205,492 B1
DATED : March 20, 2001
INVENTOR(S) : George H.J. Shaw; Bryan A. Woodruff; Thomas J. O'Rourke It is certified that error appears in the above-identified patent and that said Letters Patent is hereby corrected as shown below:

Column 3,
Line 5, before "interconnected" insert -- be --

Column 9,
Line 2, after "66a-" change "66N" to -- 66n --
Line 7, after "66a-" change "66N" to -- 66n --

Column 22,
Line 25, after "and" change "rights" to -- writes --

Column 25,
Line 2, after "only as" change "illustrated" to -- illustrative --

Column 26,
Line 53, after "one of" change "it" to -- a --

Signed and Sealed this

Twenty-sixth Day of March, 2002

Attest:

JAMES E. ROGAN
*Attesting Officer*     *Director of the United States Patent and Trademark Office*